Aug. 11, 1970  G. B. WAGENFELD  3,523,303
DISPOSABLE PAPER CAP AND METHOD OF PRODUCING SAME
Filed July 28, 1967  6 Sheets-Sheet 1
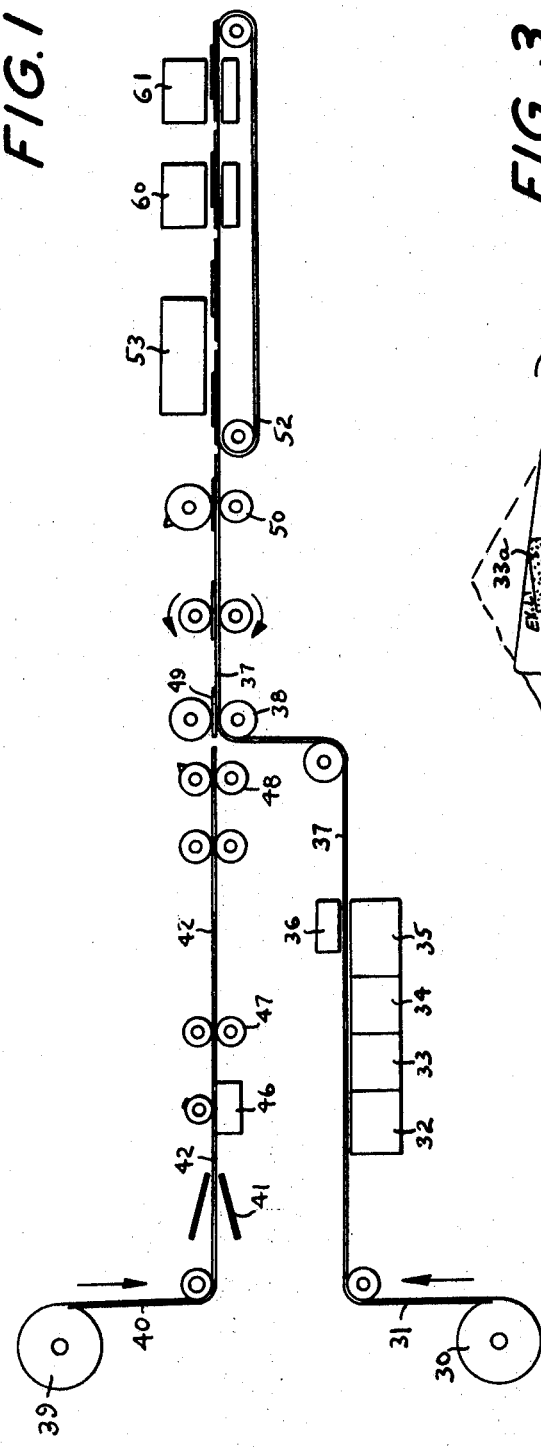
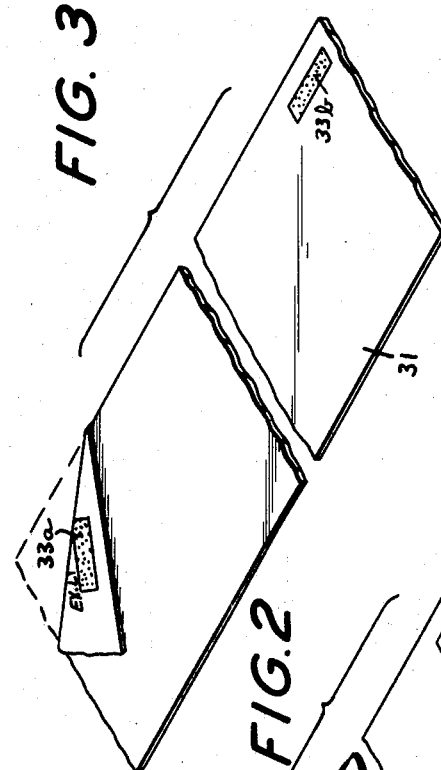
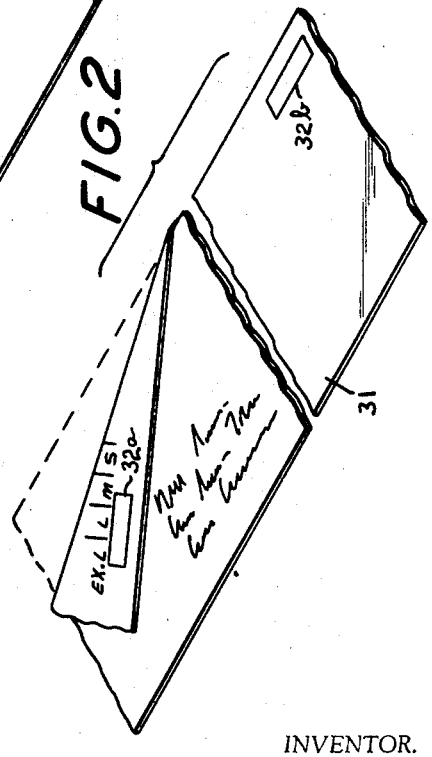
INVENTOR.
GILBERT B. WAGENFELD
BY
Edelson and Udell
ATTORNEYS Aug. 11, 1970  G. B. WAGENFELD  3,523,303
DISPOSABLE PAPER CAP AND METHOD OF PRODUCING SAME
Filed July 28, 1967  6 Sheets-Sheet 2
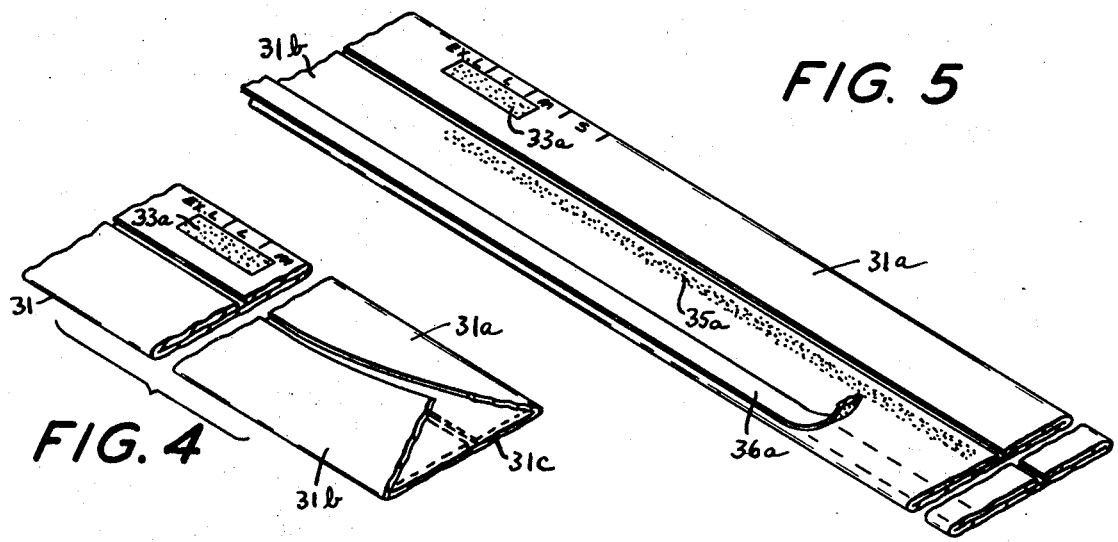
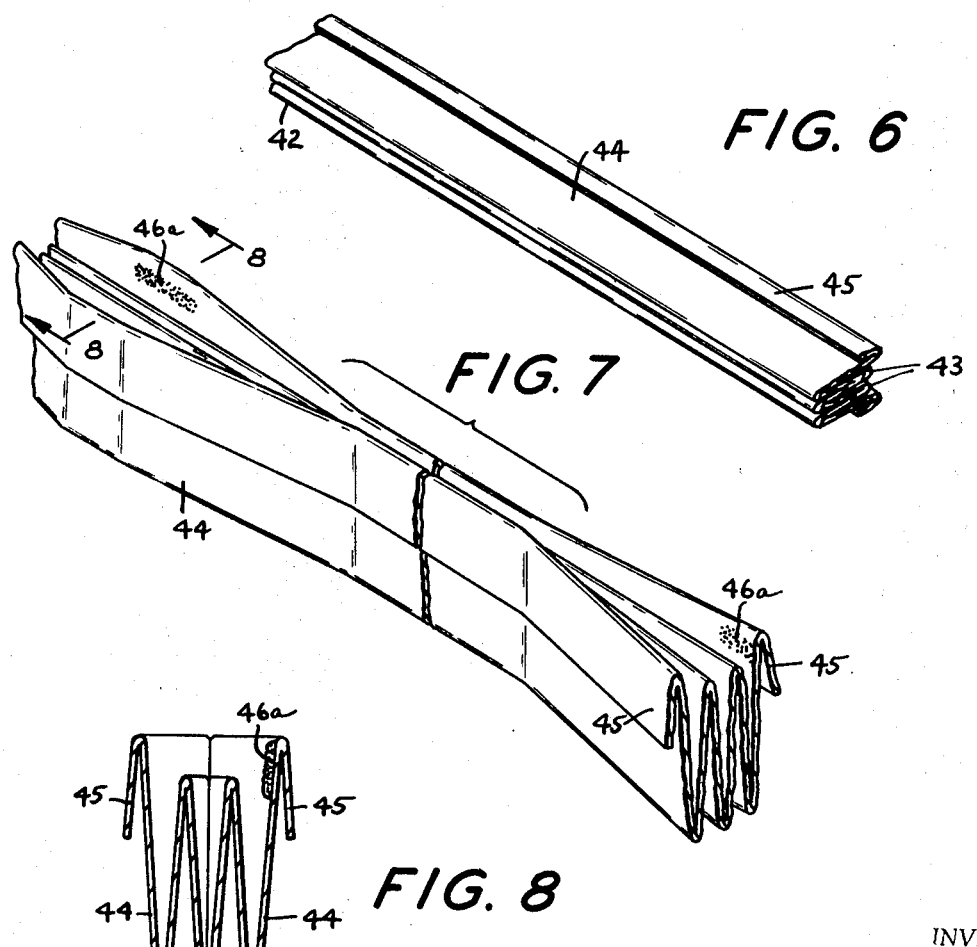
INVENTOR.
GILBERT B. WAGENFELD
BY
Nelson and Udell
ATTORNEYS Aug. 11, 1970 G. B. WAGENFELD 3,523,303
DISPOSABLE PAPER CAP AND METHOD OF PRODUCING SAME
Filed July 28, 1967 6 Sheets-Sheet 5
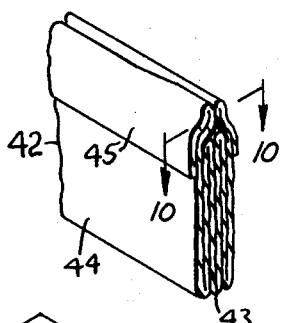
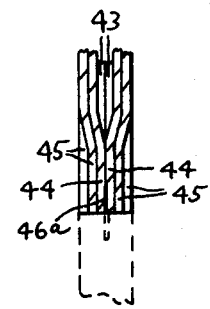
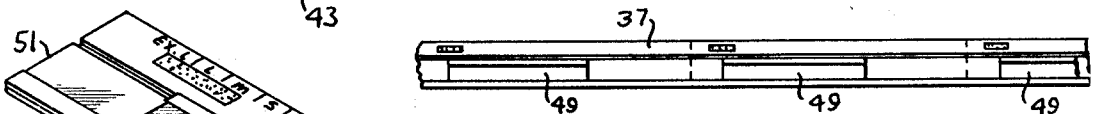
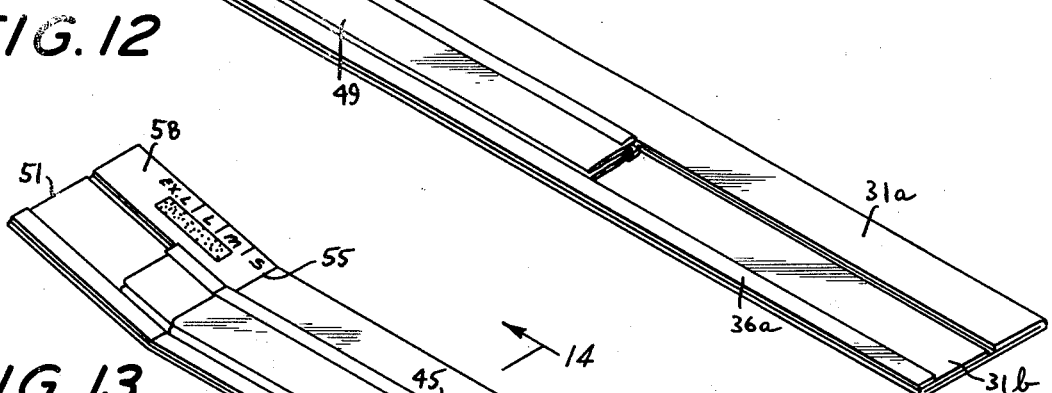
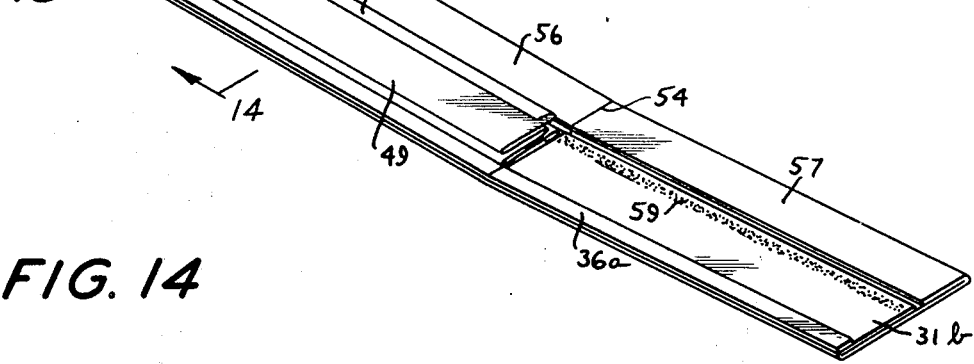
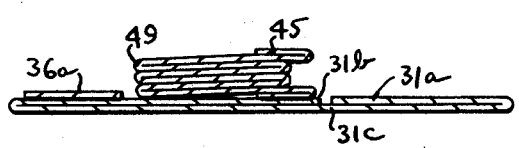
INVENTOR.
GILBERT B. WAGENFELD
BY
Edelson and Udell
ATTORNEYS Aug. 11, 1970   G. B. WAGENFELD   3,523,303
DISPOSABLE PAPER CAP AND METHOD OF PRODUCING SAME
Filed July 28, 1967   6 Sheets-Sheet 4
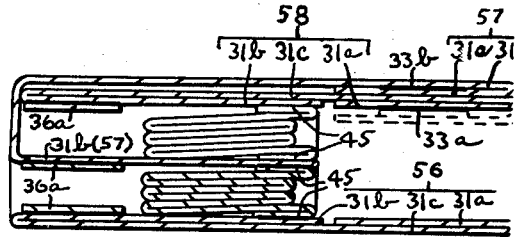
FIG. 19
FIG. 15
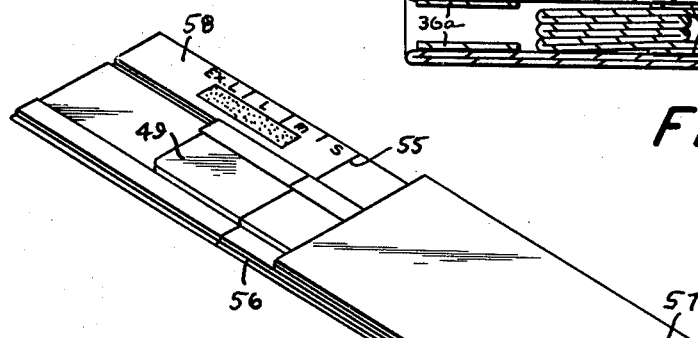
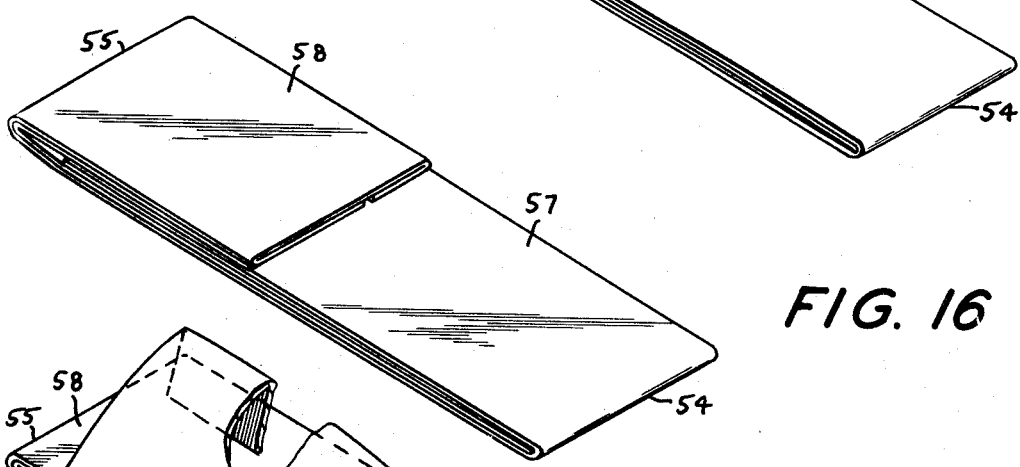
FIG. 16
FIG. 17
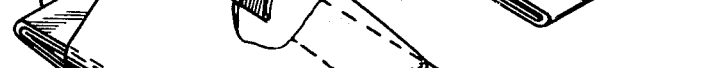
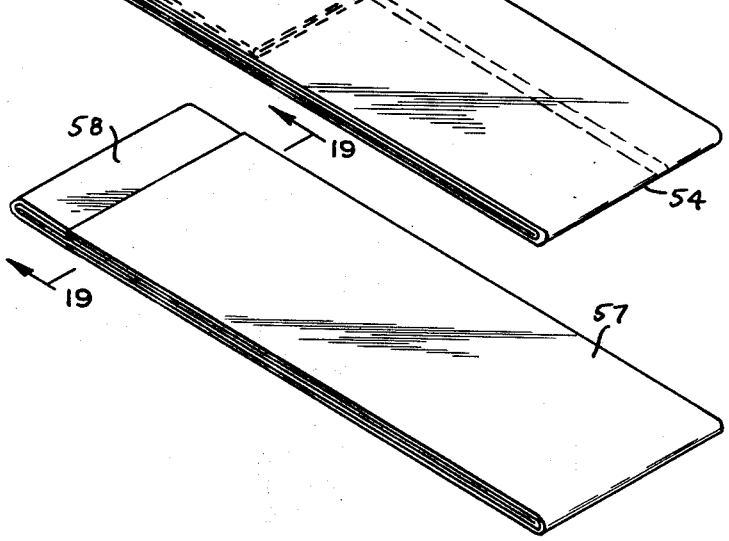
FIG. 18
INVENTOR
GILBERT B. WAGENFELD
BY
Edelson and Ude
ATTORNEYS Aug. 11, 1970  G. B. WAGENFELD  3,523,303
DISPOSABLE PAPER CAP AND METHOD OF PRODUCING SAME
Filed July 28, 1967  6 Sheets-Sheet 5
FIG. 20
FIG. 21
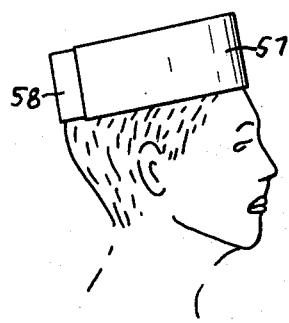
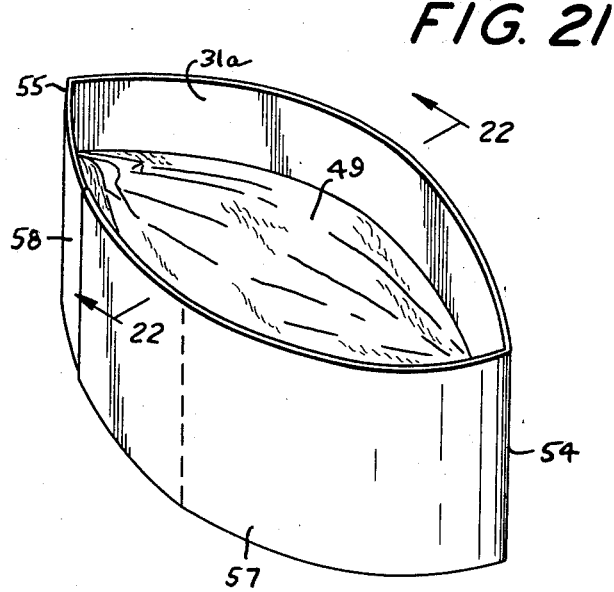
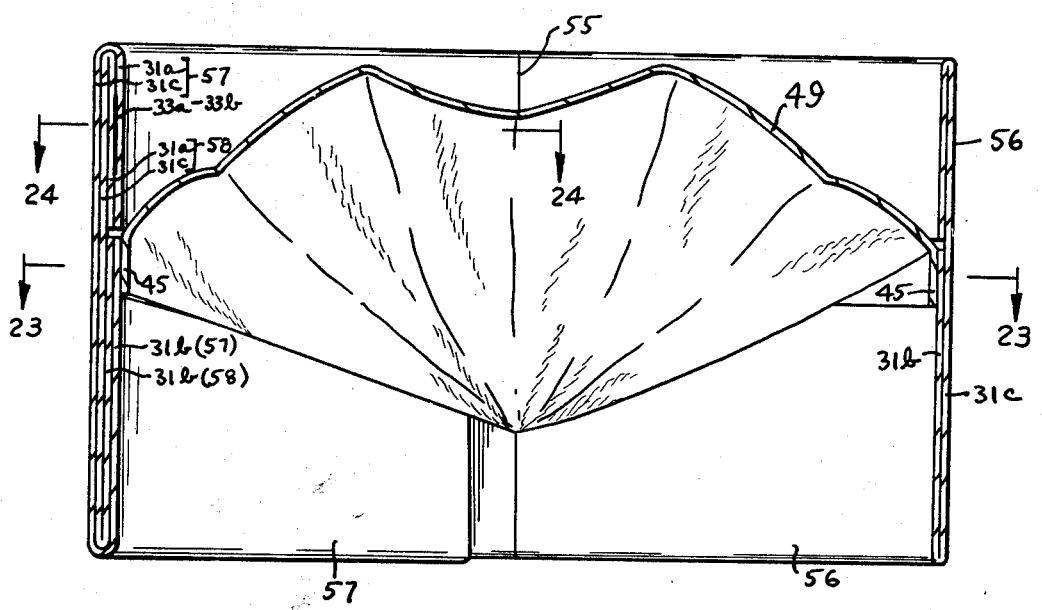
FIG. 22
INVENTOR
GILBERT B. WAGENFEL
BY
Edelson and Ud
ATTORNEYS Aug. 11, 1970          G. B. WAGENFELD          3,523,303

DISPOSABLE PAPER CAP AND METHOD OF PRODUCING SAME

Filed July 28, 1967          6 Sheets-Sheet 6

INVENTOR
GILBERT B. WAGENFELD
BY
Nelson and Uder
ATTORNEYS

United States Patent Office 3,523,303
Patented Aug. 11, 1970

3,523,303
DISPOSABLE PAPER CAP AND METHOD OF PRODUCING SAME
Gilbert B. Wagenfeld, Bala Cynwyd, Pa., assignor to Cellucap Manufacturing Co., Philadelphia, Pa., a corporation of Pennsylvania
Filed July 28, 1967, Ser. No. 656,791
Int. Cl. A42b 1/02
U.S. Cl. 2—200    11 Claims

ABSTRACT OF THE DISCLOSURE

A disposable cap having a one-piece headband with one longitudinal fixed length side panel and a pair of opposite-end interfitted side panels forming a lengthwise adjustable side to accommodate varying head sizes. The crown portion is formed of an unbroken one-piece reversely folded web to provide lateral expansion and is secured to the full length of the fixed length headband side panel and extends onto part of one of the adjustable side panels as well so that the crown is longitudinally reversely folded on itself at one end and expands or contracts longitudinally when the adjustable side panel of the headband is shifted longitudinally to expand or contract the hat size, such crown longitudinal expansion or contraction being effected by shifting one end of the crown into or out of the interfit between the headband shiftable side panels. The longitudinal reverse fold of the crown eliminates any opening in the crown regardless of the size adjusted position of the cap. Adjusted size locking is provided by pressure sensitive adhesive patches and a sweatband is optionally incorporated. The cap is made by a continuous flow method starting with continuous webs for each of the headband and crown portions.

DESCRIPTION

This invention relates to disposable paper caps of the type having a headband portion of relatively stiff material combined with a crown portion of flexible material, the two parts being intersecured in a manner providing for expansion of both parts to provide a desired head size. Heretofore in the art, paper caps of the general type having expansible headbands have been fitted with crown portions having opposite ends folded around into overlying relationship to one another to permit perimetral expansion of the headband and crown by having the same unsecured throughout their vertical extent in the region of overlap. This of course leaves a gap or space in the crown portion of the hat and is not as sanitary as would be the case were the crown portion completely closed. Moreover, this unsecured region of the hat represents a weakened area of the cap making the same less resistent to tearing with attendant destruction or loss of usefulness of the cap.

Accordingly, it is a primary object of the invention to provide a novel disposable paper cap having intersecured headband and crown portions so designed that the cap may be adjusted to a particularly desired head size with no breaks or gaps in the crown portion regardless of the adjusted size of the cap, thereby maintaining a condition of maximum sanitation in a disposable headdress.

Another object of the invention is to provide a novel disposable cap as aforesaid of the low profile type in which the crown portion is laterally expansible as required without being attended by any appreciable reduction in the vertical height of the crown portion.

A further object of the invention is to provide a novel disposable cap as aforesaid which is compact and of rectangular form in unopened condition for maximum packing density to minimize shipping and storing volume, and which includes a novel head sizing and size retaining feature together with the inclusion of a sweatband if desired.

Still another object of the invention is to provide a novel method of continuously producing the disposable caps according to the invention on a continuous basis from continuous webs of crown material and headband material.

The foregoing and other objects of the invention will appear more fully hereinafter from a reading of the following specification in conjunction with an examination of the appended drawings, wherein:

FIG. 1 is a schematic representational showing of the continuous flow method of producing the disposable caps according to the invention;

FIGS. 2 through 5 illustrate successive steps in the formation of the headband portion of the disposable cap while remaining in continuous web form;

FIGS. 6 through 10 illustrate successive steps in the formation of the crown portion of the disposable cap prior to securement of the crown portion to the headband portion;

FIG. 11 illustrates the step in production of the disposable caps wherein the crown portions have been individually severed and attached to the headbands which are still in continuous web form;

FIG. 12 illustrates a partially completed cap in which the headband portion with crown attached is severed from the continuous web;

FIGS. 13 through 18 illustrate the successive remainder of steps in forming the finished disposable cap from the discrete units illustrated in FIG. 12;

FIG. 19 is a cross-sectional view through the finished cap of FIG. 18 as would be seen when viewed along the line 19—19 of FIG. 18;

FIG. 20 is a side elevational view of a disposable cap according to the invention on the head of a wearer;

FIG. 21 is a perspective view of the disposable cap shown in FIG. 20 as would be viewed from a point forward and above the position of the cap in FIG. 20;

FIG. 22 is a vertical sectional view, on an enlarged scale, through the expanded cap of FIG. 21 as would be seen when viewed along the line 22—22 of FIG. 21;

In the several figures, like elements are denoted by like reference characters.

Figure 23:
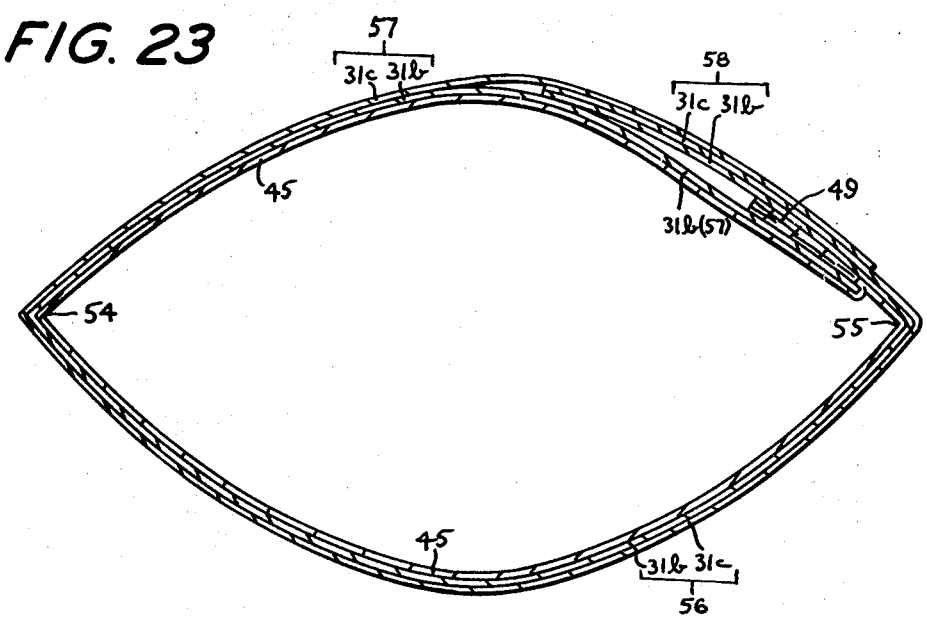
FIG. 23 is a horizontal sectional view through the cap of FIG. 21 as would be seen when viewed along the line 23—23 shown in FIG. 22.

Referring now to the drawings, consider first FIG. 1 which illustrates the continuous flow method of making the disposable caps according to the invention. It is observed starting at the left hand end, that the two parts of the cap, namely the headband portion and the crown portion, are each partially processed separately in continuous web form and are then combined for further processing as a unit. The headband stock comes from a supply 30 in the form of continuous web 31 of constant width material which is first printed at a station 32, as illustrated in the showing of FIG. 2, with any desired copy, head sizing indicia, and pressure sensitive adhesive block locations 32a and 32b, which latter are printed on opposite sides of the web 31 as illustrated.

From the printing station 32 the web 31 passes next to an adhesive applying station 33 where pressure sensitive adhesive is applied as at 33a and 33b within the printed outlines 32a and 32b. Next, the web 31 passes to a margin folding station 34 where the opposite side edges of web 31 are turned inward toward one another as shown in FIG. 4 to provide an upper panel 31a and a lower panel 31b whose edges are proximate to but slightly separated from one another, the lower panel 31b being somewhat wider than the upper panel 31a. The central portion of the headband web 31 which forms the outside surface of the headband is designated at 31c. From the folding station 34 the headband moves next to a striping station 35 where an adhesive strip 35a, as shown in FIG. 5, is applied to the upper marginal edge of the headband lower panel 31b, the length of the adhesive strip 35a being exactly equal to the length of the crown portion to be subsequently attached thereto.

If desired, a sweatband applying station 36 may also be incorporated to apply a sweatband 36a in continuous strip form to the lower marginal edge of the headband lower panel 31b. The process just described is carried out continuously on the web 31a at intervals corresponding to successive headband lengths for individual disposable caps. This continuous strip of headbands designated as 37 moves through a guiding system to a combining station 38 where the individual crown portions are secured to the headbands still in continuous strip form. The crown portions are formed in the following manner.

From a crown supply 39 is fed a continuous web 40 of crown material which passes into a folding station 41 and emerges as a continuous web of folded crown material 42, folded as shown in FIG. 6. As seen in FIG. 6, and also in FIGS. 7 and 8, the folded crown web 42 is formed with four equal height reversely folded central panels 43, a pair of outer panels 44 each of which is higher than the central panels 43, extending upward above the latter and being reversely turned downward to form a pair of short top margins 45. The folded crown 42 moves from the folding station 41 to a hot melt adhesive applying station 46 where the web is opened out at spaced intervals in the manner shown in FIG. 7 so that a dab 46a of hot melt adhesive may be applied to the inner face at the upper edge of one of the outer panels 44, as best sen in FIGS. 7 and 8.

From the station 46 the folded crown 42 moves to a pressure applying sealing station 47 where the folded crown web is again pressed together so that the dab of hot melt adhesive 46a seals together the upper edges of the inner faces of the outer panels 44 as is best seen in the showings of FIGS. 9 and 10. From FIG. 8 it is also observed that the upper folds of the central panels 43 are also caught and penetrated by the hot melt adhesive so that in effect all layers of the folded crown portion are preferably sealed together. While this is preferred, it is only actually mandatory that the upper margins of the inner faces of the outer panels 44 be sealed.

From the sealing station 47 the folded crown 42 moves onward as a continuous web to a cutting station 48 where the trailing edge of the folded crown portion web is severed at the center of the hot melt adhesive seal after the leading edge has been run in above the continuous headband strip 37 and has been caught by the combining station 38 so as to press one of the turned down top margins 45 of the folded crown down onto the adhesive stripe 35a on the headband strip 37. As soon as the leading end of the folded crown 42 has been properly indexed with respect to and secured downward to the headband strip 37, the trailing end of the folded crown is severed by the cutting station 48 so that an individual finished crown 49 is properly secured in position on the continuous headband strip 37. The rate of feed of the headband strip 37 is necessarily faster by a predetermined amount than the rate of feed of the crown portion so that finished crowns 49 are fed to the combining station 38 at a rate which produces uniform and proper spacing of the finished crowns on the headband strip 37, as shown in FIG. 11.

The headband strip 37 with finished crowns 49 attached moves onward to a cutting station 50 where the headband strip 37 is severed at fixed intervals between the finished crowns 49 to form to form individual severed headband units 51 as shown in FIG. 12. The severed headband units are fed onto a high speed conveyor 52 moving at a rate faster than the continuous strip 37 so that the individual severed headband units are spaced out at fixed intervals on the conveyor 52. These units then move onward to a station 53 where transverse score lines 54 and 55 are made to divide the unit into a central panel 56, a long end panel 57 and a short end panel 58. At this same station an adhesive stripe 59 is applied to the upper marginal edge of the headband lower panel 31b between the score line 54 and the end of the headband on the long end panel 57.

The long end panel 57 is then folded about the score line 54 so that the adhesive stripe 59 is pressed downward upon the unsecured top margin 45 of the finished crown 49 to secure the crown to the end panel 57 in the manner illustrated in FIG. 15. Next, the partially folded cap moves to a folding station 60 where the short end panel 58 is folded about the score line 55 into overlying relationship to the long panel 57. The cap now moves to an interfit station 61 where the web portions 31a and 31c of the long end panel 57 are raised so that the short end panel 58 is slipped thereunder and into overlying relationship to the lower panel portion 31b of the long end panel 57 as is best illustrated in the cross-sectional showing of FIG. 19.

As is also observed in the showing of FIG. 19, the pressure sensitive adhesive blocks 33a and 33b which are utilized to fix the headband at a selected size, are separated from one another by intervening layers of headband materials that they do not engage one another and lock the headband to thereafter prevent size adjustment. To effect size adjustment, the short end panel 58 is slipped longitudinally out of the long end panel 57 for the desired distance while at the same time the upper panel 31a of the long end panel 57 is turned upward so that it is immeditaely adjacent to and outward of the headband upper panel 31a of the short end panel 58. In this position the rectangle of pressure sensitive adhesive 33b is slidable longitudinally with respect to the head size markings until the desired size is reached, at which point the turned out upper panel 31a of the long end panel 57 is turned inward against the corresponding upper panel 31a of the short end panel 58 to bring the two pressure sensitive adhesive rectangles 33a and 33b into surface contact and thereby immediately lock the headband at the desired adjusted size.

Figure 24:
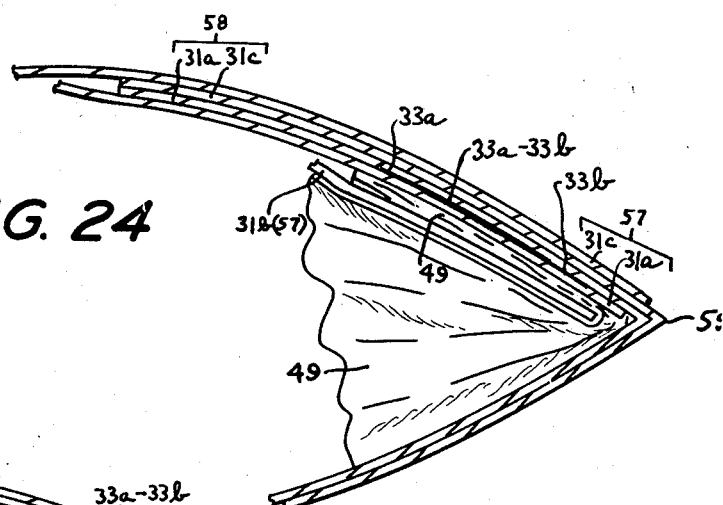
FIG. 24 is a partial horizontal view similar to that of FIG. 23 but taken at a higher elevation through the cap as would be seen when viewed along the line 24—24 of FIG. 22.
Figure 25:
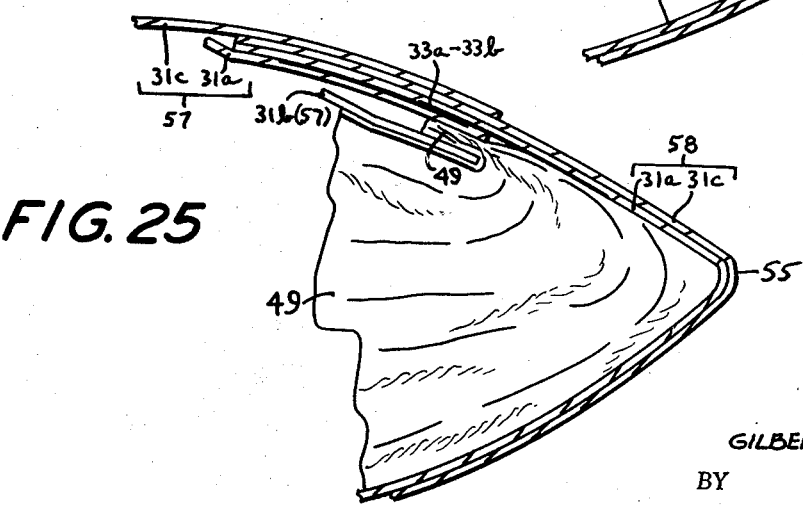
FIG. 25 is a view similar to that of FIG. 24 but illustrating the expansion of the hat size while maintaining the completely closed condition of the crown portion of the disposable cap.

These details are better seen in the cap structural showings of FIGS. 20 through 25 in which the cap is shown in expanded form for use on the head of a wearer. The showings of FIGS. 24 and 25 are particularly instructive in that they illustrate the disposable cap according to the invention in two different size adjusted positions. The showing of FIG. 24 illustrates the cap in a contracted size for a small sized head in which the short end panel 58 has been slipped further inside of the long end panel 57, of course carrying with it an additional amount of the end of the crown portion 49, so that both the headband and the crown portion are in effect longitudinally shortened by this feeding of a portion of the crown into the interfit between the relatively shiftable side panels 57 and 58.

FIG. 25 on the other hand illustrates the case where the cap has been expanded for a large head size by shifting the short end panel 58 further out of the long end panel 57 to reduce the region of interfit. Simultaneously of course, an additional portion of the end of the crown 49 moves out of the interfit region between the adjustable side panels 57 and 58 and ino the rear corner of the cap along the inside surface of side panel 58 proximate to the rear fold line 55. Thus, it is observed that the crown portion of the cap at all times presents an unbroken surface above the head of the wearer regardless of the size adjusted position of the cap.

Having now described my invention in connection with a particularly illustrated embodiment thereof, it will be appreciated that variations and modifications of my invention may now occur from time to time to those persons normally skilled in the art without departing from the essential scope or spirit of the invention, and accordingly it is intended to claim the same broadly as well as specifically as indicated by the appended claims.

What is claimed to be new and useful is:

1. A disposable cap having a one-piece headband and a one-piece crown portion secured to the headband, said headband comprising a rectangular piece of sheet material having the lower long edge turned upward toward but spaced downward from the upper long edge to form a lower inner panel overlying an outer panel, the headband being transversely scored at different distances from opposite ends to define a longitudinally extending central section with long and short end sections extending longitudinally from opposite ends of the central section, the long and short end sections being shorter than the central section and turned toward one another about the transverse scores into longitudinally adjustable interfitted relationship flatwise overlying the central section with said short end section being telescopically interfitted into said long section, said crown portion comprising a rectangular piece of sheet material of length equal to the length of said headband central section plus an extension less than the length of said headband short end section and being of a width somewhat in excess of the desired expanded crown width, said crown portion being widthwise reversely folded into a plurality of interior accordion pleated folds and a pair of terminating outer folds, said crown portion extending from one end of and being continuously secured along the full length of the upper margin of one of the said crown portion outer folds to the upper margin of the full length of said lower inner panel of said headband central section and to the upper margin of the part of the length of said short end section lower inner panel which it overlies, and said crown portion being continuously secured to the full length of the upper margin of said lower inner panel of said headband long end section along a part of the length of the upper margin of the other of said crown portion outer folds, the outer folds of said crown portion at the end secured to the headband short end section being closely secured together, whereby, said crown portion is longitudinally reversely folded on itself at one end and expands or contracts longitudinally when said interfitted headband short and long end sections are shifted longitudinally relatively to each other to expand or contract the cap size, such crown longitudinal expansion or contraction being effected by shifting the reversely folded end of said crown portion into or out of the interfit between said headband short and long end sections.

2. A disposable cap as defined in claim 1 wherein said crown portion is secured to said headband lower inner panel along the upper marginal edge of the latter.

3. A disposable cap as defined in claim 1 wherein the top to bottom dimension of said crown portion when in flat folded form is less than the top to bottom dimension of said headband lower inner panel.

4. A disposable cap as defined in claim 1 wherein the said terminating outer folds of said crown portion are of greater height than the said interior folds, extend upward above the latter, and the upper marginal edges thereof are the region of securement of the crown to the headband.

5. A disposable cap as defined in claim 1 wherein said crown portion is secured to said headband lower inner panel along the upper marginal edge of the latter, and the top to bottom dimension of said crown portion when in flat folded form is less than the top to bottom dimension of said headband lower inner panel.

6. A disposable cap as defined in claim 1 wherein the said terminating outer folds of said crown portion are of greater height than the said interior folds, extend upward above the latter, and the upper marginal edges thereof are secured to said headband lower inner panel along the upper marginal edge of the latter.

7. A disposable cap as defined in claim 1 wherein the top to bottom dimension of said crown portion when in flat folded form is less than the top to bottom dimension of said headband lower inner panel, and wherein said terminating outer folds of said crown portion are of greater height than the said interior folds and extend upward above the latter, the upper marginal edges of said terminating outer folds being secured to the crown of the headband.

8. A disposable cap as defined in claim 1 further including two longitudinally extending patches of pressure sensitive adhesive disposed on opposite faces of said headband with one patch disposed on the said short end section and one patch disposed on the said long end section, said patches overlapping one another in apposition when the headband end sections are longitudinally shifted to adjust the cap size and securing the cap in size adjusted position by being pressed against one another.

9. A disposable cap as defined in claim 2 wherein the top to bottom dimension of said crown portion when in flat folded form is less than the top to bottom dimension of said headband lower inner panel, and wherein said terminating outer folds of said crown portion are of greater height than the said interior folds and extend upward above the latter, the upper marginal edges of said terminating outer folds being secured to the crown of the headband.

10. A disposable cap as defined in claim 8 wherein the upper long edge of said rectangular piece of sheet material forming said headband is turned downward toward the said lower inner panel to also form an upper inner panel, and said pressure sensitive adhesive patches are disposed on opposite faces of said upper inner panel.

11. A disposable cap as defined in claim 10 wherein the top to bottom dimension of said headband lower inner panel is substantially greater than the top to bottom dimension of said headband upper inner panel.

References Cited

UNITED STATES PATENTS

| | | | |
|---|---|---|---|
| 2,669,725 | 2/1954 | Haegele | 2—200 X |
| 2,823,387 | 2/1958 | De Villers | 2—200 X |
| 3,082,430 | 3/1963 | Wagenfeld | 2—197 |
| 3,383,709 | 8/1968 | Bauer | 2—197 |
| 3,390,405 | 7/1968 | Gruber | 2—197 |

HERBERT F. ROSS, Primary Examiner

U.S. Cl. X.R.

2—192